April 13, 1937.  A. W. TRONNIER  2,076,686
PHOTOGRAPHIC OBJECTIVE
Filed Aug. 31, 1935
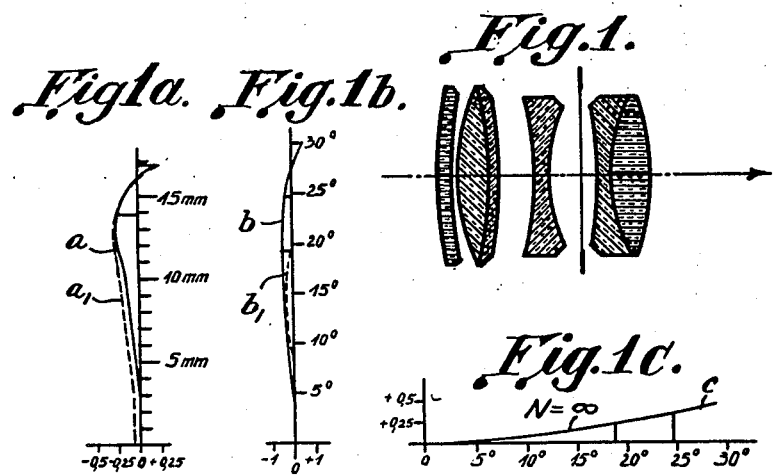
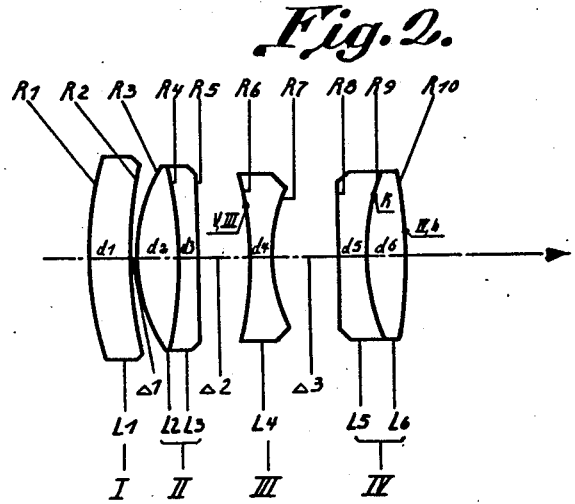
Inventor
Albrecht W. Tronnier
By Sommers & Young Attys Patented Apr. 13, 1937

2,076,686

UNITED STATES PATENT OFFICE 2,076,686

PHOTOGRAPHIC OBJECTIVE

Albrecht Wilhelm Tronnier, Bad Kreuznach, Germany, assignor to the corporation of Jos. Schneider & Co., Optotechnische Gesellschaft, Berlin, Germany Application August 31, 1935, Serial No. 38,815
In Germany November 10, 1934

2 Claims. (Cl. 88—57)

This invention relates to photographic objectives of the sub-type constituting a development of the Taylor triplet first described by Charles Clayton Minor in 1916, as well as in U. S. Patent 1,360,667, wherein two air spaced collective components are disposed in front of a simple, uncemented, and substantially unsymmetrical dispersing lens which is followed at its rear side by only one collective component, the latter in prior art systems being generally constituted as a simple, unsymmetrical biconvex collective lens. Triplets of this type, in which all of the four air spaced components consist of uncemented individual lenses, are described, for example, in German Patents 458,499, 461,083, and 535,197.

These prior art arrangements either have but a small field of view with good reduced zone correction, or else, if the field of view is increased to a range of about 45° they possess quite appreciable zone residues. In the latter case both available correctional possibilities are utilized. Either the central portion of the image must be favored at the expense of marginal definition, or else a moderately satisfactory marginal error correction is effected while permitting considerable residual axial aberration.

Although good spherical reduced zone correction was fundamentally provided in the case of particularly large primary apertures of the system without sacrificing a visual field of at least average expanse, it was necessary, in order to obtain this reduced zone correction (which, in general, obviously had to embrace at least two colors) to form one or more of the air spaced members of two or more lenses of varying refractive power and of preponderatingly unequal mathematical sign as well as different dispersive power.

The cemented surfaces entering into the structure of the system may have collective as well as dispersive power, for which purpose in general, at least one of these cemented surfaces is constituted so as to over-correct chromatically.

In the case of a plurality of cemented surfaces, these were preferably so arranged, with a view to proper balancing of the color zones that they operated essentially in sequentially chromatically opposing manner. Lenses of this sub-type of developed triplets are described, for example, in German Patents 401,274, 401,275, 428,-825, 435,762, and 436,260.

These lenses are all intended for apertures greater than f. 3.5 and in general possess good zonal correction over a useful field of view of about 40°.

In utilizing such a field of view it is found that the image exhibits appreciable comatic defects which can be distinctly decreased, insofar as they deleteriously affect the quality of the image, by using a smaller lens diameter at the image-facing end, that is, by permitting the occurrence of correspondingly appreciable indistinct portions which manifest themselves in the form of considerable marginal decrease in luminosity extending towards the margins of the image.

It has also been proposed, in order to reduce these comatic defects, so to subdivide one of the externally facing collective members into two parts of opposite mathematical sign that these two portions of the resulting substitute members include between themselves a collective air spaced lens, thus making the entire system consist of a total of five air spaced members. But even in this case the visual field cannot be appreciably increased above a 40° range without decreasing the luminous intensity if it is desired to avoid exceeding the effective capacity of the arrangement.

For the most usual photographic purposes, and to a certain extent also for projection purposes, however, a useful image field of over 50° and up to 60° is required; this can be produced by the optical designer up to a primary aperture of about f. 3.5 and with good reduced zone error correction both inter as well as intra axially considered, and supplied as a standard triplet type, particularly of the special type having a collective cemented surface in the image-facing collective member, in which case the comatic errors, even with such a large expanse of image field can be kept sufficiently small. Reference to the image side of the collective member in this case means that the system is to be used for exposing purposes, whereas when used for projection purposes the terms object-facing and image-facing sides must be considered interchanged accordingly.

However, as soon as the primary aperture of these three component Taylor type objectives of large visual field is increased appreciably beyond f. 3.5 the attempt to exceed the effective capacity associated therewith necessitates that their correctional construction take care of increased zonal residues which cannot adequately be decreased by the above mentioned insertion of additional cemented surfaces in one or more of the three components.

By the present invention the advantages of the two above described triplet variations are conjointly united while thoroughly obviating their drawbacks. The new objectives, considered as a further step in triplet development are provided with at least one, i. e. collective cemented surface in the collective image-facing member (i. e. generally expressed, in the end having the shorter radiating width) making a total of four air spaced members embodying at least five components and having a relative aperture of more than f. 3.5. The excellent inter and intra axial correction extends over a field of more than 50° and up to 60° without requiring for this high total efficiency the use of extremely curved surfaces or especially long glass traversing paths, the system of the invention being likewise admirably adapted to the requirements of commercial manufacture.

The new objectives therefore permit of such correction of errors that within the aforesaid visual field the positional deviations of the sagittal and meridional image surfaces are kept below about 3/4 per cent of the focal length accompanied by such correction of spherical aberration that its greatest zonal horizontal error remains below about 3/8 per cent of the focal length. By meeting the sine-coincidence condition the images coincide in the neighborhood of the axes not only as to position but also as to size for the various aperture zones and are therefore free from interaxial coma.

Consequently in objectives made according to the present invention the extra-axial comatic aberrations may be advantageously corrected so that the image produced by the lateral rays even at large apertures essentially permits, within the useful visual field, the production of as good definition as is produced in the center of the image.

In order to explain the subject of the present invention use will be made of the elements of the parallel auxiliary rays to which the Schwarzschild measure equation applies.

$$\Phi_{1,K} = \sum_{i=1}^{K} \frac{n_i' - n_i}{r_i} h_i = 1$$

where $n_i$ and $n_i'$ are the indices of refraction before and after the radius of curvature $r_i$, and the height of incidence of the parallel auxiliary ray is denoted $h_i$, and the index $n_i$ is the surface number from the first to the rear radius of the system. In the equation, for each of the $i$ sum arguments the abbreviation $\bar{\varphi}_F$ (surface effect) may be substituted. If the effect of the nu−1 surface preceding the nu surface be designated by $$\bar{\varphi}'_{V_{nu-1}} = \bar{\varphi}_{V_{nu}} \text{ (rest effect)}$$

then we have, as always, $$\bar{\varphi}'_{V_{nu}} = \bar{\varphi}_{V_{nu}} + \bar{\varphi}_{F_{nu}} = \bar{\varphi}_{V_{nu+1}}$$

and for the transit from the nu to the nu+1 surface we have:

$$h_{nu+1} = h'_{nu} = h_{nu} - \sigma h_{nu}$$

which may be expressed as:

$$\sigma h_{nu} = \bar{\varphi}'_{V_{nu}} \cdot \frac{d_{nu, nu+1}}{n'_{nu}}$$

In explaining this invention the terms "surface effect" and "rest effect" have their usual meaning as employed in this art, for instance, as in my prior patent, No. 1,987,878, dated January 15, 1935.

This effect value makes it possible clearly to depict the constructional system involved since the individual surfaces are defined by the $\bar{\varphi}$ value, not only according to difference in refractive exponents and curvature, but also according to position, wherefore these values, in addition, serve directly or indirectly (formation of invariants) for expressing the aberrational coefficients, e. g. of the 3rd order. The essence of the invention in this case is expressed as involving such distribution of the refractive effect among the individual components of the new objectives that the surface effect $\bar{\varphi}_{F_K}$ considered as the product of the coincident height of the auxiliary ray ($h_K$), refractive exponent difference ($n_K' - n_K$), and radius reciprocal ($1:r_K$) for the total cemented surface (K) in the positive outer member (IV) facing the shorter radiating width, considered as its absolute value, is greater than a quarter of the rest effect $\bar{\varphi}_{VIII}$ or as the algebraic sum of all the surface effects of the three air spaced members (I II III) of the entire system which precede said outer member and of which the two outer ones (I II) act also as collective components, while the third and cemented inner member (III) disposed on the side of the outer member (IV) located at the side of shorter radius has a strongly dispersive action.

It has furthermore developed that particularly excellent correctional relations may be secured if in addition to distributing the refractive effect in the members III and IV in such a manner among the individual outer surfaces of these members that the surface effect of the front surfaces ($v$, III) facing away from the outer member IV of the dispersing component III considered with respect to their absolute values is greater than a third of (at most, however, equal to) the surface effect of the rear surfaces (IV, $h$) facing away from the inner member III of the positive outer component IV, that is, after the ratio $\bar{\varphi}_{F_{v,III}} : \bar{\varphi}_{F_{IV,h}}$ lies between the absolute values 1/3 and 1.

Furthermore, very advantageous constructional arrangements are obtained if in addition to distributing the refractive effect care be taken that the rest effect $\bar{\varphi}'_{v_{II}}$ directed towards the collective member II adjacent the uncemented dispersing inner lens III, regarded as the algebraic sum of all surface effects of both front collective members I II is greater than two-thirds (at most, however, double as great as) the surface effect $\bar{\varphi}_{F_{IV,h}}$ of the rear surface IV, $h$ facing away from the inner member III of the positive outer member IV, that is, that the ratio $\bar{\varphi}'_{v_{II}} : \bar{\varphi}_{F_{IV,h}}$ lies between the values 2/3 and 2.

The drawing illustrates diagrammatically an objective according to the invention having a focal length of 100 mm. The objective is shown in vertical side section in Fig. 1. Fig. 2 diagrammatically illustrates the optical characteristics as referred to the table giving the features of the described embodiment. Figs. 1a, 1b and 1c show the curves of the correction for the embodiment. Fig. 1a shows the spherical aberration for the yellow as a full line curve a and for violet as a dotted curve a1 relative to the ideal image plane, indicated through the ordinate. On the abscissa, the plus and minus deviations given by this ideal image plane are indicated in percentages of the focal distances, while on said ordinates the distances in mm. of the parallel incident marginal radiations from the optical axis are indicated.

Fig. 1b shows the astigmatic state of correction of the new objective. The full line curve b shows the deviations of the sagittal, while the dotted line curve b1 shows that of the meridional image point from the axial image point lying in the ideal image plane (the ordinate) in percentages of the focal distances, which latter are indicated on the abscissa. The main radiation inclinations are indicated in angle degrees on the ordinate, the ordinate being in the zero point of these horizontals.

Figs. 1a and 1b correspond to the v. Rohr-Merte method.

The curve c on Fig. 1c shows the designation for the drawing scale N=∞, that is, for the "infinitely remote object". On the abscissa, according to the method of E. Wandersleb, the main radiation inclinations are shown in degrees, while the indications on the ordinates, in the zero point of this line, are shown in percentages of the image height and may be read off. The indicia given correspond to the values given in the table, the correctional relations being those based on W. Merté's recently proposed scale (W. Merté: "Handbuch der wissenschaftlichen und angewandten Photographie") (= Handbook of scientific and applied photography), Volume I "Das photographische Objektiv" (= The Photographic Objective), 1932. The distance of the Gauss image plane from the image vertex of the last lens is indicated by $p'_0$. The focal length of the numerical example is equal to unity. The indicated refractive exponents relate to the violet ray whereas the color dispersion of the glasses used is characterized by the Abbe Number V. In the drawing the members of the objective are designated left to right by numerals I, II, III and IV. The individual lenses of which these members are composed are designated from left to right by reference characters L1, L2, L3, L4, L5 and L6. The distances of the members apart are designated $\Delta 1$, $\Delta 2$, and $\Delta 3$. The mid-point thicknesses of the individual lenses are indicated by characters $d1$, $d2$, $d3$, $d4$, $d5$ and $d6$, while the radii of the surfaces of the lenses are designated left to right by R1 ... R10. The second of the two front collective members of this embodiment is composed of two cemented together individual lenses of opposite algebraic sign. Consequently the cement surface radius K of the outer member IV has the position number 9, the radius of the rear surface of this member is therefore R10.

The front radius of the uncemented dispersive inner member III R6 is identical with the surface ($v$, III) so that $\overline{\varphi}_{F_6}$ may be written for $\varphi_{F,\mathrm{III}}$ and so on for the rest effect of the last surface of the collective member II, e. g. the radius R5 of the embodiment, where $\overline{\varphi}'_{V_5}$ may be substituted for $\overline{\varphi}'_{\mathrm{VII}}$ of the general characterization. In an analogous manner $\overline{\varphi}'_{V_7}$ may be substituted for $\overline{\varphi}'_{\mathrm{VIII}}$ Relative aperture f. 2.9 $p'_0 = .8059$

| | | | |
|---|---|---|---|
| $R_1 = +.8285$ | | | |
| $d_1 = .04147$ | | $n_1 = 1.63290$ | $\nu_1 = 60.4$ |
| $R_2 = +1.7255$ | | | |
| $\Delta 1 = .00407$ | air | | |
| $R_3 = +.4392$ | | | |
| $d_2 = .06221$ | | $n_2 = 1.57175$ | $\nu_2 = 60.7$ |
| $R_4 = -.6897$ | | | |
| $d_3 = .01667$ | | $n_3 = 1.57620$ | $\nu_3 = 45.3$ |
| $R_5 = -12.428$ | | | |
| $\Delta 2 = .06627$ | air | | |
| $R_6 = -.6897$ | | | |
| $d_4 = .03663$ | | $n_4 = 1.60085$ | $\nu_4 = 40.8$ |
| $R_7 = +.3345$ | | | |
| $\Delta 3 = .08314$ | air | diaphragm space | |
| $R_8 = -2.6928$ | | | |
| $d_5 = .03527$ | | $n_5 = 1.52625$ | $\nu_5 = 54.7$ |
| $R_9 = +.3998$ | | | |
| $d_6 = .07248$ | | $n_6 = 1.65170$ | $\nu_6 = 56.1$ |
| $R_{10} = -.4268$ | | | |

Here $\overline{\varphi}_{F_9} = +.249705$, $\overline{\varphi}'_{V_7} = -.326853$ and .249705 is greater than .326853:4. Furthermore, $\overline{\varphi}_{F_6}$ is $= -.680523$, $\overline{\varphi}'_{V_5} = +1.714414$ and $$\overline{\varphi}_{F_{10}} = +1.230500$$

Therefore the ratio values are $$.680523 : 1.230500 = .553046,$$

and $$1.714414 : 1.230500 = 1.393266;$$

hence, as claimed, .553046 lies between the values ⅓ and 1 while 1.393266 lies between the values ⅔ and 2.

I claim:

1. A photographic objective composed of four air-spaced members comprising a simple, uncemented, and essentially unsymmetrical dispersing lens, two air-spaced collective lenses, disposed in front of said dispersing lens, and a collective component following said dispersing lens on its rear side, said following collective component including a collective, cemented surface, refractive effect being so distributed among the individual components that the surface effect $\overline{\varphi}_{F_K}$, considered as the product of the auxiliary ray incident height ($h_k$), refractive exponent difference ($n_k' - n_k$), and radius reciprocal ($1:r_k$) for the collective cemented surface $k$ in the positive following component is, according to its absolute value, greater than ¼ of but not over 1½ times the rest effect $\overline{\varphi}'_{\mathrm{VIII}}$ directed toward the last surface of the dispersing lens considered as the algebraic sum of all surface effects of dispersing lens and two preceding collective lenses, the length of the curvature radius of the cemented surface $k$ of said following component being less than 1½ times the radius R10 of the last outer surface of the objective, and the refractive effect being so distributed among the individual outer surfaces of the dispersing lens and following collective component that the surface effect of the front surfaces ($v$, III), facing away from the outer member IV, of the dispersive lens is, according to its absolute value, greater than one-third, but not greater than equal to the surface effect of the rear surface, facing away from the dispersive lens, of the positive following component, that is, that the ratio $\overline{\varphi}_{F_{v,\mathrm{III}}} : \overline{\varphi}_{F_{\mathrm{IV},h}}$ lies between the absolute values ⅓ and 1.

2. Photographic objective composed of four air-spaced members according to claim 1, in which the refractive effect is distributed among the collective components of the system, so that the rest effect $\bar{\varphi}'_{VII}$ directed towards the collective member in front of and adjacent to the dispersive lens, regarded as the algebraic sum of all surface effects of both front collective members, is greater than two thirds but not over double the surface effect $\bar{\varphi}_{F_{IV,h}}$ of the rear surface facing away from the inner member of the positive outer member following the dispersive lens, that is, that the ratio $\bar{\varphi}'_{VII} : \bar{\varphi}_{F_{IV,h}}$ lies between the values ⅔ and 2.

ALBRECHT WILHELM TRONNIER.

Certificate of Correction

Patent No. 2,076,686.             April 13, 1937.

ALBRECHT WILHELM TRONNIER

It is hereby certified that errors appear in the above numbered patent requiring correction as follows: In the grant and in the heading to the printed specification, residence of inventor, for "Bad Kreuznach, Germany" read *Bad Kreuznach (Rhineland), Germany*; page 2, second column, line 33, for "$\bar{\varphi}_{VIII}$" read $\bar{\varphi}'_{vIII}$; line 60, for "$\bar{\varphi}'_{vII}$" read $\bar{\varphi}'_{vII}$; line 69, for "$\bar{\varphi}'_{vII} \cdot \bar{\varphi}_{F_{IV},h}$" read $\bar{\varphi}'_{vII} \cdot \bar{\varphi}_{F_{IV},h}$; page 3, first column, line 72, for "$\varphi_{F,III}$" read $\bar{\varphi}_{F,III}$; line 75, for "$\bar{\varphi}'_{vII}$" read $\bar{\varphi}'_{vII}$; and second column, line 2, and line 56, claim 1, for "$\bar{\varphi}'_{VIII}$" read $\bar{\varphi}'_{vIII}$; page 4, first column, line 5, claim 2, for "$\varphi'_{VII}$" read $\bar{\varphi}'_{vII}$; and second column, line 5, same claim, for "$\bar{\varphi}'_{VII}$" read $\bar{\varphi}'_{vII} \cdot \bar{\varphi}_{F_{IV},h}$; and that the said Letters Patent should be read with these corrections therein that the same may conform to the record of the case in the Patent Office.

Signed and sealed this 14th day of September, A. D. 1937.

[SEAL]

HENRY VAN ARSDALE,
*Acting Commissioner of Patents.*